INVENTOR.
LAWRENCE R. McMILLEN
BY Russell L. Root
Atty.

INVENTOR
LAWRENCE R. McMILLEN
BY Russell L. Root

INVENTOR.
LAWRENCE R. McMILLEN
BY Russell L. Root
Atty.

INVENTOR.
LAWRENCE R. McMILLEN
BY Russell L. Root
Atty.

United States Patent Office 3,474,230
Patented Oct. 21, 1969

3,474,230
PARITY CHECK MULTIPLE SCAN SCANNING SYSTEM FOR MACHINE READ CODE CHARACTERS

Lawrence R. McMillen, Euclid, Ohio, assignor to Addressograph-Multigraph Corporation, Cleveland, Ohio, a corporation of Delaware Filed June 19, 1967, Ser. No. 647,046
Int. Cl. G06k 5/00
U.S. Cl. 235—61.7 8 Claims

ABSTRACT OF THE DISCLOSURE

A data conversion machine is described using machine-read bar code data from individual record members to control an output device such as a card punch, a teletype printer, or the like. The machine includes a means for advancing record cards one by one through a sensing station including an array of individual photocells or other sensing devices for scanning the bar code data on the record cards. The sensing devices are electrically coupled to a shift register code memory, the data from the memory being applied to an output interface circuit that translates the bar code to a working code for controlling the output device. The sensing devices are also connected to a parity check circuit that determines whether or not the number of code elements in each sensed code character corresponds to a given parity condition, and develops a parity or non-parity signal indicative of the condition. The parity signal actuates a first blanking means that effectively blanks the sensing device, whenever parity is found, for a period of time long enough to permit the code character being sensed to clear the sensing station. The non-parity signal actuates a second blanking means that blanks the sensing devices for a much shorter time interval and thus provides for plural independent sensing of any code character initially found to exhibit a non-parity condition.

CROSS REFERENCE TO RELATED APPLICATION

This application discloses a complete data conversion system that is also disclosed in the copending application of Max E. Sallach, Donald N. Heisner and Robert G. Baker, S.N. 647,460, filed June 20, 1967; the present application is directed to the scanning system of the data conversion apparatus and particularly to the parity control for the scanning system, whereas the copending application relates primarily to the data storage and conversion apparatus actuated by the scanning system.

BACKGROUND OF THE INVENTION

In many business machines that utilize machine-read code data, a parity check is utilized to confirm the accuracy of the data reading operation. Systems of this kind may be employed in machines that control the printing of records from machine-readable code data, in machines that produce further machine-readable records encoded in accordance with different codes from the original data, and in many other applications. A typical example of a machine of this general kind is the punching machine described and claimed in Patent No. 3,069,075 to M. E. Sallach issued Dec. 18, 1962.

In the punching machine of the aforesaid Sallach patent, and in many other types of machines actuated by mechanically interpreted code data, a parity check may be provided to determine whether the individual code characters being read are in fact accurately interpreted. For example, the code characters that control the machine may be encoded in accordance with a parity code requiring that each code character include a specific number of code elements. Two code elements for each code character may be utilized where only numerical data is employed; a larger number may afford the basis for a parity check if alphabetical characters are to be processed in the machine. But the parity check itself may be misleading, particularly where the record cards or other record members that provide the information for control of the machine are produced by equipment that has any tendency toward inaccurate imprinting or other encoding of the record cards. Thus, the parity check may result in a determination of an inaccurate character where one or more of the code elements constituting that character is imperfectly formed. The parity check apparatus may also indicate an erroneous character if extraneous markings or other defects appear in the code data on the record member. That is, the parity check apparatus itself may constitute a source of error in the control of a machine.

SUMMARY OF THE INVENTION

It is a principal object of the present invention, therefore, to minimize or eliminate errors in the operation of a machine utilizing machine-read code data, which errors arise from a parity check apparatus that is incorporated in and forms a part of the scanning system of the machine.

A more specific object of the invention is to provide for plural scanning of each code character that is found not to conform to a given parity condition in the scanning system of a machine utilizing machine-read code data encoded in accordance with a given parity code.

A further object of the invention is to provide effective compensation for misalignment of code characters or of the sensing devices in the scanning system of a machine that utilizes machine-read code data and that includes a parity check applicable to each character of the code data.

Accordingly, the present invention relates to an improved scanning system for reading code characters of given width disposed in predetermined spaced relation on a record member, each code character including a given number of individual code elements according to a predetermined parity code, the scanning system being incorporated in a machine that includes record feed means for advancing a record member through a sensing station. The scanning system of the invention includes plural sensing devices, at the sensing station, for sensing the presence of individual code elements and for developing initial data signals representative thereof. A parity circuit is coupled to the sensing devices and is made responsive to the data signals to develop a parity signal or a non-parity signal, depending on whether a sensed code character corresponds to the established parity condition. A first blanking means, actuated by the parity signal, is provided for effectively blanking the sensing devices for a relatively long time interval to enable the record member to advance one character width through the sensing station each time a parity condition is observed. A second blanking means is actuated by the non-parity signal and blanks the sensing devices for a much shorter time interval, upon determination of a non-parity condition, providing for plural independent sensing of any code character that does not initially exhibit conformance to the parity requirements. Preferably, delay means are provided for delaying operation of both of the blanking means for a limited time, in sensing each code character, to compensate for possible misalignment of the code characters or of the sensing devices.

Other and further objects of the present invention will be apparent from the following description and claims and are illustrated in the accompanying drawings, which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE PREFERRED EMBODIMENT

Figure 1:
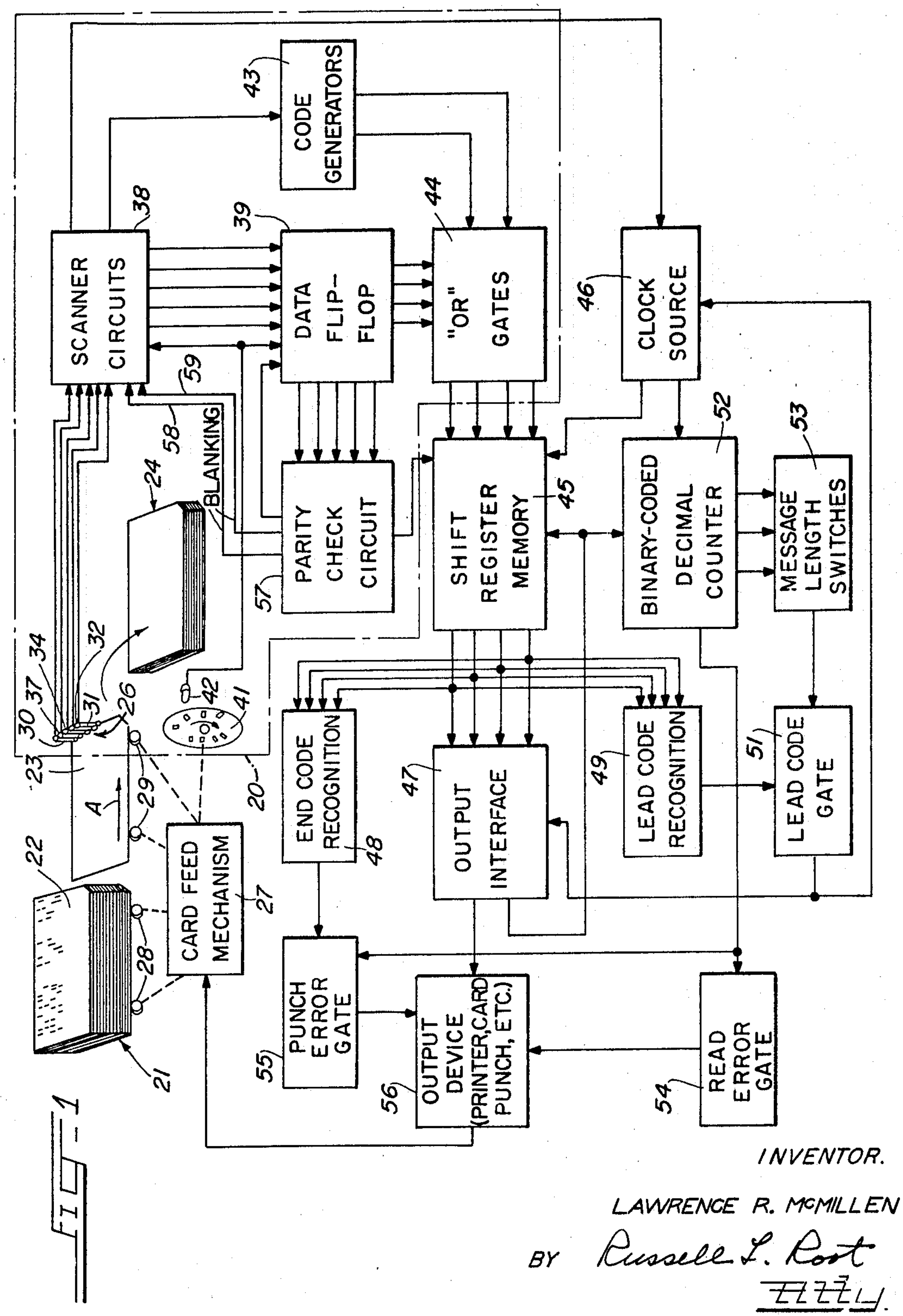
FIG. 1 is a block diagram of data conversion apparatus including a scanning system constructed in accordance with the present invention.

The business machine illustrated in block diagram form in FIG. 1 is a data conversion machine that includes a scanning system 20 constructed in accordance with the present invention. In the data conversion machine, at the left-hand side of the drawing, there is a stack 21 of individual record members, the general form and configuration of the record members being apparent from the top record member or card 22 on the stack. One record member 23 that has been fed from the bottom of stack 21 is shown entering a sensing station 26 in the scanning system 20. From the sensing station 26, the individual record members are deposited in a receiving or finished card stack 24.

The card feed mechanism 27 for the machine may be of generally conventional construction. It includes appropriate drive apparatus for driving feed rollers 28 located beneath the stack 21 to advance the individual record members toward the position of the member 23 in the drawing. Additional feed rollers 29, also driven from the mechanism 27, are employed to advance the record members through the sensing station 26 and on to the receiving stack 24. The card feed mechanism may include appropriate devices for limiting the feed of the record members to one record at a time; inasmuch as the mechanical construction of devices of this kind is well known in the art, no details of this structure are provided herein.

At the sensing station 26, a plurality of individual sensing devices 30, 31, 32, 34 and 37 are provided. These sensing devices, which may comprise individual photocells, are aligned with the positions of the individual code elements for code characters imprinted or otherwise formed on the record members 22. In the detail description provided hereinafter, it is assumed that the code characters on the record members constitute opaque markings of given width. However, it should be understood that punched holes may be utilized as the code elements on the record members and that the configuration for the code elements may vary for different record-keeping systems.

The sensing devices 30, 31, 32, 34 and 37 are individually electrically coupled to a plurality of scanner circuits 38. Scanner circuits 38 include, in essence, individual coupling circuits for applying the electrical signals from the sensing devices to a series of data flip-flop circuits generally represented by the circuit unit 39 in FIG. 1. In the preferred embodiment discussed in detail hereinafter, the individual scanner circuits 38 may each comprise a single AND circuit.

The scanning system 20 further includes a timing disc 41 that is driven in synchronism with operation of the card feed mechanism 27. The timing disc 41 is provided with a plurality of apertures which limit the illumination of a photocell 42 to predetermined time intervals in relation to the operating cycle of the card feed mechanism. The photocell 42 is electrically connected to the data flip-flop circuits 39 to afford a timing and control signal for the flip-flop circuits.

In addition to the output connection from the scanner circuits 38 to the data flip-flop circuits 39, a further output connection is afforded from the scanner circuits to a code generator circuit unit 43. The circuit unit 43 may include two, three, or more individual circuits that are coupled to the OR gates 44 to develop special codes. Thus, it is usually desirable to develop a separate identification code indicative of the entry of the lead edge of a record member into the sensing stations of the system. Another distinctive code is preferably generated to indicate the completion of the sensing of an individual record member. For particular output devices coupled to the data conversion system of FIG. 1, additional special codes may be required as, for example, a line feed code to be incorporated in the code data immediately following the initial leading edge code.

The outputs from the OR codes 44 are electrically coupled to a shift gate register memory unit 45. The shift register memory is also provided with a timing input signal from an appropriate clock source 46. The clock-source 46 is controlled by an electrical signal supplied thereto from the scanner circuits 38.

The shift register memory 45 includes a plurality of output circuits that are individually coupled to an output interface unit 47, an end code recognition circuit 48, and a lead code recognition circuit 49. The output interface unit 47 may include a conventional code translation circuit for translating the code data from the shift register memory 45 into a form directly usable by the particular output device to be actuated in accordance with the code data from the record members. The output interface unit 47 may also include appropriate control apparatus for starting, stopping, and other control operations with respect to the output device.

The lead code recognition circuit 49 is electrically connected to a lead code gate 51. The lead code gate 51 is also controlled by a binary coded decimal counter 52 that receives input signals from the output interface 47 and from the clock source 46. The counter 52 is electrically connected through one or more message length switches 53 to supply a gating signal to the lead code gate 51. The message length switches 53 are provided for the purpose of setting the system to operate in connection with code data on the record members that includes a specific number of individual code characters, and provide a means for adjusting the system for code messages of varying length.

The output from the lead code gate 51 is electrically connected to the output interface 47 to control the operation of the interface circuit in initiating a readout operation. The lead code gate 51 is also connected to the clock source 46 to control the application of clock pulses to the shift register memory 45.

In addition to its connection to the message length switches 53, the binary coded decimal counter 52 is electrically connected to a read error gate 54 and to a punch error gate 55. The punch error gate also includes an input connection from the end code recognition gate 48. The two error gates 54 and 55 and the output interface circuit 47 are all electrically connected to an output device 56. In a typical installation, the output device 56 may comprise a conventional printer such as a teletype receiver, a card punch, a magnetic tape recording unit, or any other apparatus in which the code information from the individual record members is to be utilized. The output device 56 is electrically or mechanically connected to the card feed mechanism 27 to control operation of the card feed.

Figure 3:
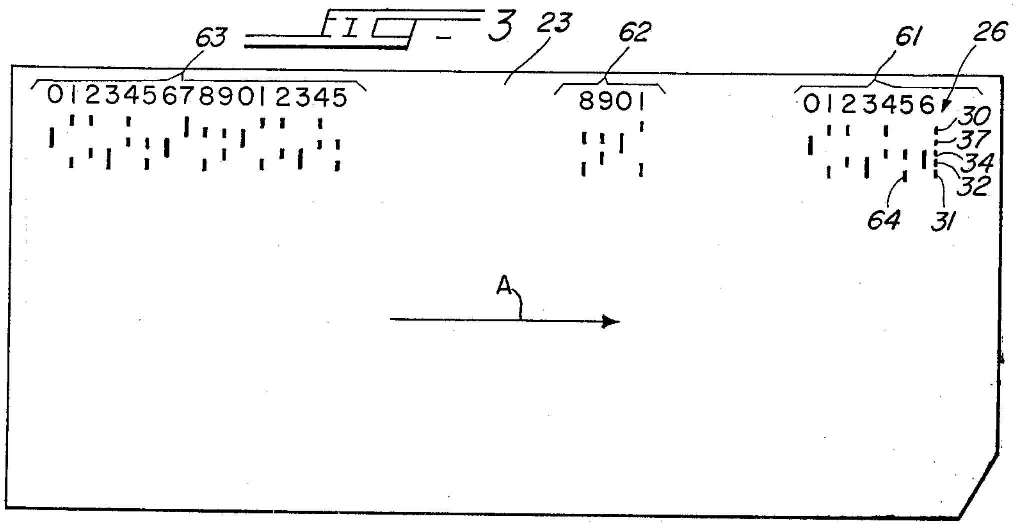
FIG. 3 illustrates a typical record member to be scanned by the scanning system of the invention.

Before describing the overall operation of the data conversion apparatus of FIG. 1, a specific data code and related arrangement for the sensing devices may first be considered. FIG. 3 illustrates the individual record member 23 approaching the sensing station 26, in the direction indicated by the arrow A, on a much larger scale than FIG. 1. The record member 23 carries three different groups 61, 62 and 63 of individual code characters. The code for the characters in groups 61–63 is one in which each code character includes exactly two individual code elements. That is, the code adopted for this particular record member, and others to be used in the same scanning system, is one in which parity requirements are based upon the utilization of exactly two code elements in each code character. The representations for individual numerical values, in this particular code, are as follows:

TABLE I

| | Bar Code Position | | | | |
|---|---|---|---|---|---|
| | 1 | 2 | 4 | 7 | 0 (Parity) |
| Data No.: | | | | | |
| 1 | X | | | | X |
| 2 | | X | | | X |
| 3 | X | X | | | |
| 4 | | | X | | X |
| 5 | X | | X | | |
| 6 | | X | X | | |
| 7 | | | | X | X |
| 8 | X | | | X | |
| 9 | | X | | X | |
| 0 | | | X | X | |

From Table I, it will be seen that the "zero" code position is used for parity purposes only and is not directly significant of the numerical value for the code character.

As will be apparent from the detailed description of the invention set forth hereinafter, the invention is not dependent upon the specific two-element parity code described and illustrated above. Rather, it may be adapted to a parity code requiring the use of three, four, or more individual code elements in each code character. This is particularly true where alphabetic characters are to be incorporated together with numerical characters. However, the simpler situation, with a two-element code utilized only for numerical data, is incorporated in this specification and in the drawings to simplify the disclosure.

As shown in FIG. 3, the data sensing device 30 is aligned with the "zero" code elements on the record member 23 as the record card is advanced into and through the sensing station 26. The photocells or other sensing devices 31, 32, 34 and 37 are aligned with the code positions for the numerical values one, two, four and seven, respectively.

Figures 3A, 4, 5:
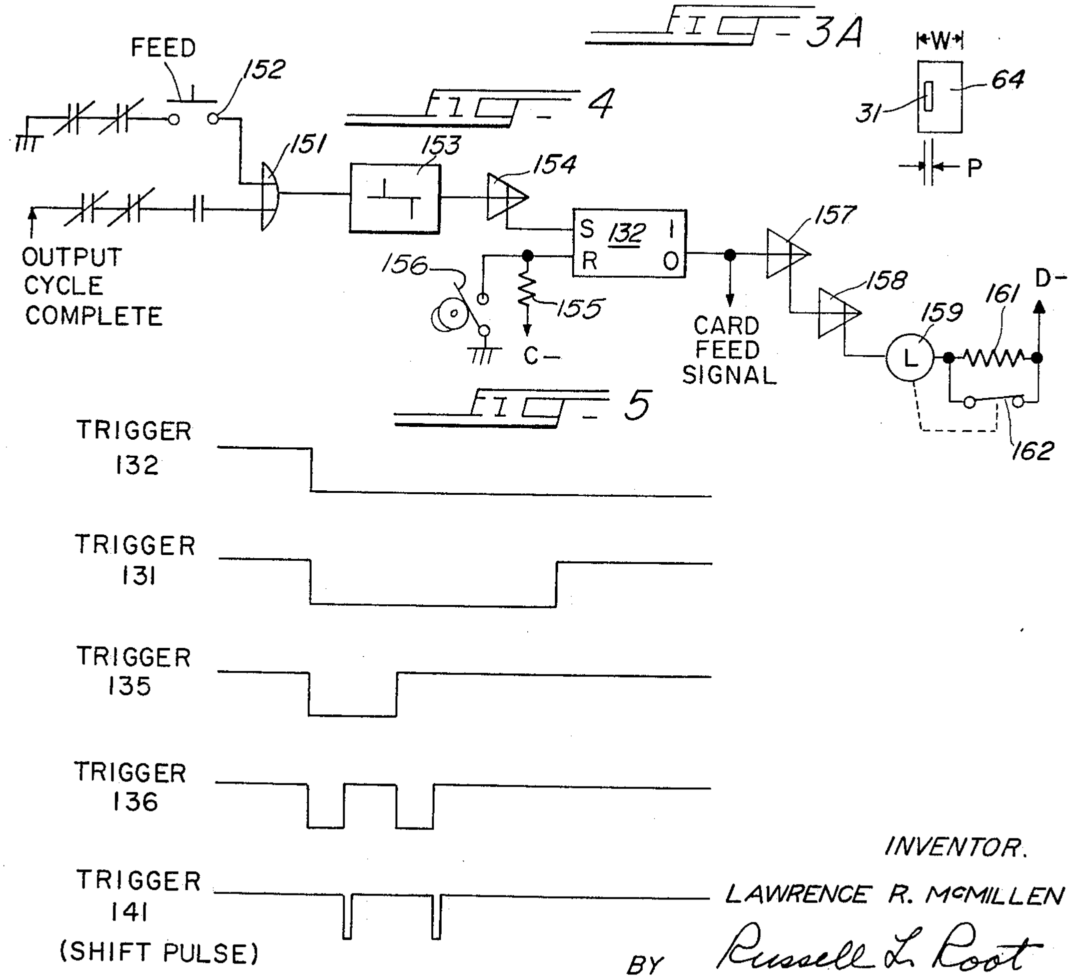
FIG. 3A is an enlarged detail view of a portion of FIG. 3.
FIG. 4 is a partially schematic logic diagram of a machine control circuit for the data conversion apparatus of FIG. 1.
FIG. 5 is a timing chart for a part of the scanning system of FIG. 2.

FIG. 3A illustrates a width relationship, between the photocells or other sensing devices and the individual code elements, that is utilized in order to obtain the full advantages of the present invention. As shown in FIG. 3A, the viewing or sensing aperture for each sensing device, such as the sensing device 31, is of quite restricted width and constitutes a very narrow slit having a width P. Each individual code element, such as the code element 64, is of a much greater width W. Preferably, the relation should be such that the width W is three, four or more times the width P. This makes it possible to obtain a multiple scanning action with respect to each code element, as explained hereinafter.

Referring again to FIG. 1, when operation of the data conversion apparatus shown therein is initiated, the card feed mechanism 27 is actuated to feed a first card from the bottom of the stack 21 in the direction of the arrow A. The leading edge of the card is sensed by one or more of the photocells at sensing station 26, producing an output signal that is supplied to the scanner circuits 38 to condition the scanner circuits for a sensing operation. The lead-edge signal is also supplied, through scanner circuits 38, to the code generators 43. In a typical system, the code generators 43 first develop a specific lead code which is different from any of the data codes on the record members and this first data code is supplied to and recorded in the shift register memory 45, through the OR gates 44.

Before the first data code is sensed from the card 23, a second non-data code may be recorded in the shift register memory. For example, if the output device 56 is a conventional printer such as a teletype receiver, it may be desirable to effect a carriage return or line feed operation in the output device immediately prior to the recording of each group of data characters from the record members. To this end, a second distinctive code may be developed by the code generators 43 and supplied through the OR gates 44 to be recorded in the shift register 45.

After the initial control codes have been recorded in the shift register memory (there may be more than two such codes, depending upon the particular output device employed and other considerations) the first code character on the record member 23 enters the sensing station 26. The code elements constituting the code character are sensed by the appropriate ones of the sensing devices 30, 31, 32, 34, and 37, developing output signals that are supplied through the scanning circuits 38 to the data flip-flop circuits 39. The data flip-flop circuits 39 develop characteristic output signals representative of the initial data signals from the scanner circuits and these output signals are supplied to the parity check circuit 57 and to the initial stage of the shift register 45 through OR gates 44. The parity circuit 57 determines whether the operating conditions of the individual data flip-flop circuits 39 indicate that exactly two code elements, representative of a code character corresponding to a parity condition, have been sensed. If the parity circuit 57 ascertains that a parity condition exists, a shift signal is supplied to the register 45 to record the code character in the shift register. A reset signal is also supplied to the data flip-flops 39, resetting the data flip-flops. At the same time, a blanking signal is supplied to the scanner circuits 38 through a first blanking circuit 58.

The blanking signal supplied to the scanning circuits 38, by means of circuit 58, inactivates the scanner circuits, and thus effectively inactivates the related sensing devices, for a predetermined time interval at least equal to the time required to advance the record member 23 one character width through the sensing station 26. That is, determination of a parity condition by the parity circuit 57 causes the parity circuit to develop a blanking signal that prevents any further scanning of the character that has been indicated to be a true character under the requisite parity code. The scanner circuits, and associated sensing devices, are held in blanked condition until the next code character on the record member 23 enters the sensing station 26.

In a normal operation, the sequence of steps set forth above continues for each scanned code character. Every time that the parity circuit 57 detects a true parity condition, with just two code elements present in a code character, the scanning portion of the scanning system 20, comprising the scanner circuits 38 and the sensing devices coupled thereto, is blanked to prevent repetitive sensing of the same character.

It may happen, however, that an additional marking is super-imposed on the correct code markings so that, for a given code character, three or more apparent code elements are sensed. When this occurs, the data signals supplied to the parity check circuit through the scanner circuits 38 and the data flip-flops 39 result in a determination, in the parity circuit, that a non-parity condition exists. The data flip-flop circuits 39 are then reset from the parity check circuit without recording of information signals in the shift register 45. Furthermore, a blanking signal is supplied to the scanner circuits 38 over a second blanking means comprising an electrical circuit 59.

In this instance, however, the blanking signal supplied to the scanner circuits 38, through the second blanking circuit 59, is much shorter in duration than the blanking signal developed when a parity condition is recognized. For a non-parity condition, the blanking signal supplied to the scanner circuits 38 over the second blanking circuit 59 is made substantially shorter than the time required to advance the record member 23 one character width through the sensing station 26. Thus, the blanking signal is terminal before the character passes completely through the sensing station.

Upon termination of the short blanking signal on the circuit 59, the scanner circuits and the associated sensing devices 30, 31, 32, 34 and 37 again sense the same character that produced the non-parity output signals from parity check circuit 57. If the extraneous marking that produced the impression of a third code element on the initial scanning is not wide enough to be sensed in this second sensing of the same code character, a parity condition is ascertained by the parity circuit 57. As a consequence, a long-duration blanking signal is again supplied to the scanner circuit 38 is prevent further scanning of the same code character, a reset signal is supplied to the data flip-flop circuits 39, and the sensed character is recorded in the shift register memory 45, through the OR gates 44.

The number of times that an individual code character may be sensed is dependent upon the duration of the short-term blanking signal that is supplied to the scanner circuits 38, in response to determination of a non-parity condition in circuit 57, in relation to the time interval required for a single code character to pass through the sensing station 26. Typically, the scanning system 20 may be constructed to allow as many as three or four individual sensing operations with respect to an individual code character that does not exhibit a parity condition. In most systems, more than four scans of the same code element is merely redundant, although in special circumstances an additional number of scanning operations per code character may be provided.

Of course, if the scanned code character consistently exhibits a non-parity condition for each scan thereof, the code character ultimately moves past the sensing station 26 with no data having been recorded in the shift register memory 45. Under these circumstances, the data previously recorded in the shift register memory may be advanced one stage by the signal from the clock source 46, which is required for each recording operation in the shift register memory. This leaves a totally blank position in the shift register memory which can be subsequently detected as a reading error. Alternatively, the data in the shift register can be left without advancement, resulting in a discrepancy in the total number of character codes ultimately recorded from the record member. This discrepancy can be detected, by means of the counter 52 and the read error gate 54. A reading error of this kind can be used to trigger an alarm or to produce some other control effect to enable the machine operator to know that a defective reading operation has occurred. The net result is the same whether the non-parity condition results from an excess of marks present in any code character position or from a lack of code elements at any such position.

Where the code characters are arranged in groups such as the groups 61, 62 and 63 (FIG. 3) it is necessary to provide some means for preventing scanning operations in the spaces intermediate the code character groups, particularly in those instances where other data may be recorded on the record member. This is also true where the data conversion system is not intended to read all of the groups of data characters as, for example, in an instance in which it may be desirable to read the data groups 61 and 63 but to omit group 62. This is a principal function of the synchronizing disc 41 and the photocell 42, which limit operation of the data flip-flops 39 to those portions of the record members which contain the information to be sensed and employed in the control of the output device 56. The number and grouping of the apertures in the synchronizing disc 41 is selected to limit operation of the scanning system 20 to those portions of the recorded data on the cards that is to be used in control of the output device.

When the trailing edge of the card 23 approaches the scanning station 26, a termination signal is developed by the synchronizing disc photocell 42 and passed through the scanner circuits 38 to the code generator unit 43. This signal, which may also be employed to inactivate the scanner circuits until the next card approaches the sensing station, causes the code generator unit to develop an additional characteristic code indicative of the end of a sensing operation. This separate code character, which should be distinctively different from any of the data codes, is recorded in the shift register memory 45 through the OR gates 44.

When the scanning of the data from an individual card has been completed, the clock source 46 advances the recorded data through the shift register memory 45, and readout is initiated. The first code, it will be recalled, is the special lead code indicative of the beginning of the sensing operation. This code is recognized in the circuit 49 and produces an output signal that is supplied to the lead code gate 51. If the lead code signal recognition occurs in coincidence with an output signal from the message length switches 53, an actuating signal is supplied to the output interface circuit 47. The message length switches, which are preset to the expected length for each code message from the individual record members, work in conjunction with the counter 52 to assure that the number of code characters recorded in the shift register memory is the correct number for a given code message of an individual record member.

After recognition of the lead code, and assuming coincidence thereof with a correct count from circuits 52 and 53, the output interface circuit 47 is energized and receives, in sequence, the individual code characters previously recorded in the shift register memory 45. Any special codes from the code generators 43 that have been recorded prior to the recording of data from the record member, as described above, are first received and interpreted by the output interface circuit 47. These special codes may be utilized to control such functions in the output device 56 as a carriage return, paper advance, or the like. The data codes follow immediately after the special control codes. These data codes are translated in the output interface circuit 47 into an appropriate code for controlling the output device 46 and are supplied to the output device to control its operation.

As the recorded data is read out of the shift register memory 45, the count in counter 52 is continued. The final countdown in counter 52 should coincide with recognition of the special end code, which is identified by circuit 48. If the count and the recognition of the end code occur in coincidence, operation of the output device 56 is terminated by means of the punch error gate 55 without further incident. If the end code is recognized at a time when the count from counter 52 does not correspond to the correct count for the end of a message, the punch error gate actuates an appropriate alarm or otherwise conditions the output device 56 to indicate to the system operator that an error has occurred in the punching, printing, or other operation.

Upon completion of a printing, punching, or other output operation, an appropriate signal is developed by the output device 56 to actuate card feed mechanism 27, feeding another card toward the sensing station 26. Thus, the operation proceeds continuously as described above.

The present invention is concerned particularly with the scanning system 20, a particular embodiment of which is described in detail hereinafter. Much of the remainder of the data conversion system illustrated in FIG. 1, including particularly the shift register memory 45 and the controls for the output interface circuit 47, comprises the subject matter of the copending application of Max E. Sallach, Donald N. Heisner and Robert G. Baker filed concurrently herewith, to which reference may be made for details of the construction and operation of that portion of the data conversion system.

SPECIFIC LOGIC CIRCUITS FOR ONE EMBODIMENT OF THE INVENTION

Figure 2:
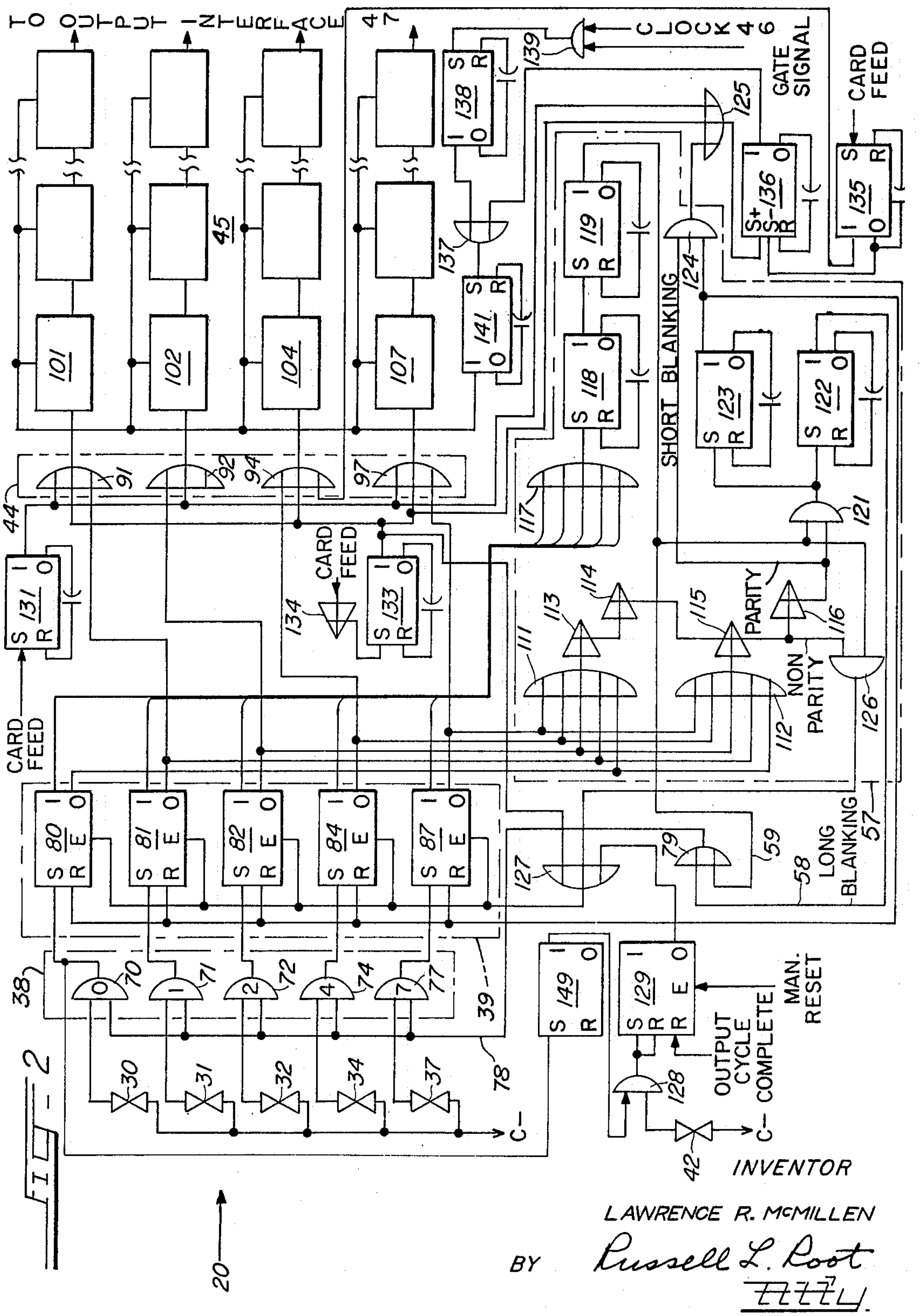
FIG. 2 is a logic diagram, partially schematic, of a preferred construction for the scanning system of the invention.

In FIG. 2, the data sensing devices 30, 31, 32, 34 and 37 are shown as individual photocells each connected to a suitable D.C. supply designed as C−. The photocell 30 is also electrically connected to a first AND circuit 70 that is a part of the scanner circuit unit 38. Similarly, the sensing photocells 31, 32, 34 and 37 are each electrically connected to one of the inputs of an individual AND circuit 71, 72, 74 and 77, respectively, in the scanner circuits 38. Each of the AND circuits 70, 71, 72, 74 and 77 has a second input; the second input of each of these AND circuits is electrically connected to a conductor 78 that is connected to the output of an OR circuit 79. The inputs to the OR circuit 79 are the two blanking circuits 58 and 59.

As shown in FIG. 2, the data flip-flop unit 39 of the system comprises five individual flip-flop circuits 80, 81, 82, 84 and 87. The set input to flip-flop circuit 80 is electrically connected to the output of the AND circuit 70 in the scanner circuits 38. Similarly, the outputs of the AND circuits 71, 72, 74 and 77 are connected to the set inputs of the flip-flop circuits 81, 82, 84 and 87, respectively.

The OR gate unit 44, in the embodiment illustrated in FIG. 2, includes only four OR circuits 91, 92, 94 and 97. There is no necessity for a fifth OR gate corresponding to the "zero" level of the recorded code data because it is not necessary to carry the parity information forward into the shift register 45. The first OR gate 91 is electrically connected to the zero output of the flip-flop circuit 81. Each of the OR circuits 92, 94 and 97 is provided with an individual input from the corresponding flip-flop circuits 82, 84 and 87, respectively.

The output of OR circuit 91 is connected to the first stage 101 in the initial level of the shift register memory 45. The shift register memory may be of conventional construction and may comprise a relatively large number of individual stages each capable of recording a single bit of information at any given time. The first stage 102 in the second level of the shift register is electrically connected to the output of the OR circuit 92. The first stage 104 in the next level of the shift register is electrically connected to the output of the OR circuit 94 and the first stage 105 in the final level of the shift register is electrically connected to the remaining OR circuit 97.

The parity check circuit 57, in the form illustrated in FIG. 2, includes two OR circuits 111 and 112. Each of these two OR circuits is provided with five inputs that are individually electrically connected to the zero outputs of the flip-flop circuits 80, 81, 82, 84 and 87. The OR circuit 111 is electrically connected to the input of an inverter amplifier 113 that in turn drives a second inverter amplifier 114. The output of OR circuit 112 is applied to an inverter amplifier 115 that is also connected to the output of the amplifier 114. The amplifier 115 drives a further inverter amplifier 116.

The parity check circuit 57 further includes an additional OR circuit 117 having five inputs electrically connected to the "one" outputs of the flip-flop circuits 80, 81, 82, 84 and 87, respectively. The output of the OR gate 117 is connected to the set input of a one-shot trigger circuit 118. The one-shot trigger circuit 118 may be of conventional construction, with components selected to provide for automatic resetting of the circuit to its original operating condition, following a set input, after a time interval of 1.2 milliseconds.

The "one" output of the one-shot trigger 118 is connected to the set input of a second one-shot trigger circuit 119. Circuit 119 is constructed to afford automatic reset after a time interval of 0.5 millisecond. The "one" output of the one-shot trigger circuit 119 is the short-interval blanking circuit 59, which is coupled to one of the inputs of the OR circuit 79 in the parity check circuit.

The short-interval blanking signal from the circuit 59 is also supplied to one of the inputs of an AND circuit 121. A second input to the AND circuit 121 is supplied from the output of the inverter amplifier 116. The output of the AND circuit 121 is connected to the set input of each of two one-shot trigger circuits 122 and 123. The one-shot circuit 123 is constructed to afford automatic reset after a time interval of 2 milliseconds. The one-shot circuit 122, on the other hand, resets after a longer time interval, in this instance 5 milliseconds. The "one" output of the one-shot circuit 122 is the long-interval blanking circuit 58.

The "one" output of the trigger circuit 123 is connected to the reset inputs of each of the data flip-flop circuits 80, 81, 82, 84 and 87. The signal on this circuit provides for resetting of the data flip-flops as described more fully hereinafter. The "one" output terminal of the trigger circuit 23 is also connected to one input of an AND circuit 124. The second input to the AND circuit 124 is taken from the inverter amplifier 116. The output of the AND circuit 124 is supplied to one of three inputs of an OR circuit 125.

In addition to the connections described above, the "one" output of the one-shot trigger circuit 119 is also connected to one input of an AND circuit 126. The other input to the AND circuit 126 is taken from the inverter amplifier 115. The output of the AND gate 126 is supplied to one input of an OR circuit 127 that is in turn connected to the auxiliary reset terminals of each of the data flip-flop circuits 80, 81, 82, 84 and 87.

In the circuit arrangement of FIG. 2, the synchronizing disc photocell 42 is connected to the C− supply and to one input of an AND circuit 128. The AND circuit 128 has a second input from a card presence flip-flop circuit 149. The output of the AND circuit 128 is connected to both the set and the reset input terminals of a flip-flop circuit 129. The flip-flop circuit 129 may be provided with an additional reset input indicating completion of an operating cycle of the output device 56. Manual reset of the flip-flop circuit 129 is also provided by a connection to the auxiliary reset terminal of the flip-flop circuit. The "zero" output terminal of the flip-flop circuit 129 is connected to one of the inputs of the OR circuit 127 to control resetting of the data flip-flop circuits 39 as described more fully hereinafter.

The scanning system 20 of FIG. 2 further includes a one-shot trigger circuit 131 that is automatically reset after a time interval of 2.5 milliseconds following setting of the circuit. The set input to the trigger circuit 131 is a card-feed signal that is derived from a card feed flip-flop circuit 132 described more fully hereinafter in connection with FIG. 4. The "one" output of the trigger circuit 131 is connected to an input for each of the OR circuits 91, 92 and 97 so that the trigger circuit 131 functions as one of the code generators of the code generator unit 43 (FIG. 1). In addition, the "one" output terminal of the trigger circuit 131 is electrically connected to one of the inputs of the OR circuit 125.

Another part of the code generator circuits, in the embodiment illustrated in FIG. 2, comprises a one-shot trigger circuit 133 that is utilized to develop a terminal or end code. The trigger circuit 133 is constructed to reset itself after a time interval of 6 milliseconds. The set input for the trigger circuit 133 is derived from an inverting amplifier 134, the input signal to the amplifier 134 being the card feed signal derived from the flip-flop circuit 132 in FIG. 4. The "one" output of the trigger circuit 133 is electrically connected to each of the OR circuit 91, 94, and 97 to produce a desired terminal code. The "one" output of the trigger circuit 133 is also electrically connected to one of the inputs of each of the OR circuits 125 and 127.

Yet another component circuit for the code generator unit, in the specific embodiment illustrated in FIG. 2, is a one-shot trigger circuit 135 constructed to reset itself after a time interval of 700 microseconds. The set input to the trigger circuit is the card feed signal from the flip-flop circuit 132 of FIG. 4. The "one" output of the trigger circuit 135 is connected to the OR circuit 94.

The output of the OR gate 125 is connected to one set input of a one-shot trigger circuit 136. The trigger circuit 136 is constructed to reset automatically after a time interval of 300 microseconds. The trigger circuit is provided with a second set input that is electrically connected to the "zero" output of the one-shot circuit 135. The "one" output of the trigger circuit 136 is electrically connected to one input terminal of an OR gate 137.

The OR circuit 137 is a part of a stepping circuit that advances recorded data through the shift register memory 45. The second input to the OR circuit 137 is derived from the one output of a one-shot trigger circuit 138. The trigger circuit 138 has a reset time interval of 25 microseconds. The set input to the trigger circuit 138 is taken from the clock source 46 through an AND gate 139. An additional gate signal is supplied to AND gate 139 from another part of the machine, as described hereinafter.

The output of the OR circuit 137 is connected to the set terminal of a one-shot trigger circuit 141 having a reset time of six microseconds. The "one" output of the trigger circuit 141 is connected to the shift circuits of each of the individual stages in the shift register 45.

The flip-flop circuit 149 derives its setting input signal from the AND circuit 70; any of the other data AND circuits 71, 72, 74 or 77 could be used if desired. This connection provides for setting of the flip-flop upon sensing of the leading edge of each card. An appropriate card cycle signal is used to reset this flip-flop circuit.

FIG. 4 illustrates a basic operating circuit that may be utilized in actuation of the card feed mechanism 27. The input to the operating circuit comprises an OR circuit 151 having two inputs. The first input to the OR circuit 151 may be connected to system ground through a manually operated card feed switch 152. One or more sets of relay contacts may be included in series in the circuit comprising the switch 152 to limit the times at which a card feed cycle may be initiated. The other input to the OR circuit 151 constitutes a cycle signal indicative of completion of a full cycle of operation by the output device 56 (FIG. 1). Again, relay contacts may be provided in the circuit to prevent erroneous operation.

The output of the OR circuit 151 is coupled to a pulse circuit 153 that produces a double-spike pulse that is in turn supplied to an inverting amplifier 154. The output of amplifier 154 is connected to the set input of the card feed flip-flop circuit 132.

The reset terminal of the flip-flop circuit 132 is connected to the C— supply through a resistor 155. The reset terminal is also connected to a normally open cam-actuated switch 156 that is returned to system ground. The switch 156 is closed near the end of each card feed cycle to reset the flip-flop circuit 132 and initiate a card feed signal at the "zero" output of the flip-flop circuit.

The "zero" output of the card feed flip-flop circuit 132, in addition to the connections described in connection with FIG. 2, is connected to the input of an inverting amplifier 157 having its output in turn connected to the input of a second inverting amplifier 158. The output of the amplifier 158 is connected to one terminal of a solenoid 159. The other terminal of the solenoid 159 is connected to a D.C. supply, designated as D—, through a resistor 161. A normally closed switch 162 is connected in parallel with the resistor 161 and is actuated to open position whenever the solenoid 159 is energized.

BEGINNING THE CARD FEED CYCLE

In considering the operation of the scanning system 20, as illustrated in FIG. 2, and supplemented by FIG. 4, it should be understood the intermediate amplifier stages which do not perform separate logical functions have been omitted from the logic diagram, FIG. 2. Moreover, the usual power supply circuits are not shown in FIGS. 2 and 4 for the most part, since the power supplies may be of conventional construction and do not constitute a critical part of the invention.

With the power supplies energized, and the scanning system ready for operation, the clock source 46 operates continuously and supplies a high frequency clock signal, through the AND gate 139, to the set terminal of the 25-microsecond trigger circuit 138. The trigger circuit automatically resets itself 25 microseconds after it is set. Each time the trigger circuit 138 resets, an actuating signal is applied to the set terminal of the one-shot trigger circuit 141 through the OR circuit 137. The trigger circuit 141, each time it is set, resets in 6 microseconds, producing an output signal that is supplied to the shift lines in the shift register 45. In effect, this continuously shifts zero information through the shift register, no data having been recorded therein, maintaining the shift register 45 clear and ready for the reception of recorded data.

The first card feed cycle is initiated by closing the manually operated card feed switch 152, FIG. 4. Closing of this switch completes an electrical circuit to the pulse circuit 153, through the OR circuit 151, and supplies an output signal to the amplifier 154. This signal, in turn, is supplied to the set terminal of the card feed flip-flop circuit 132, setting that flip-flop circuit. The setting of the flip-flop circuit 132 effectively energizes the clutch solenoid 159, through the amplifiers 157 and 158. Energization of the clutch solenoid 159 starts the card feed mechanism 27 (FIG. 1) in operation and begins the feeding of the first record member toward the scanning station 26.

The setting of the card feed flip-flop circuit 132 (FIG. 4) also produces a card feed signal that is supplied to the set input terminal of the flip-flop circuits 135 and 131 in the scanning system 20, FIG. 2. The card feed signal is also utilized, through a gate circuit not shown in the drawings, to actuate the AND circuit 139 to closed condition, and interrupt the supply of clock pulses to the flip-flop circuit 138.

The setting of the one-shot trigger circuit 131 is also effective to apply a set signal to the one-shot trigger circuit 136, through the OR circuit 125. It is thus seen that the trigger circuits 131, 135, and 136 of FIG. 2 are all set virtually simultaneously with the setting of the trigger circuit 132 of FIG. 4, the time relationship being illustrated graphically in FIG. 5.

The setting of the trigger circuits 131 and 135 applies a four-bit lead code to the four data OR circuits 91, 92, 94 and 97, the "one" terminal of the trigger circuit 131 is connected to the OR circuits 91, 92 and 97 and the "one" terminal of the trigger circuit 135 is connected to the remaining OR circuit 94. 300 microseconds later, when the trigger circuit 136 automatically resets, it sets the one-shot trigger circuit 141 through the OR circuit 137. Six microseconds later (see FIG. 5) the trigger circuit 141 resets. When the circuit 141 resets, an output signal is supplied to the shift lines of the shift register 45, recording the four-bit lead code in the shift register and stepping that code forward one stage in the register.

The trigger circuit 135 automatically resets 700 microseconds after being initially set by the card feed signal.

When the trigger circuit 135 resets, it supplies a set signal to the one-shot trigger circuit 136, so that the circuit 136 is again actuated to its set condition. After 300 microseconds, the one-shot trigger circuit 136 again resets and again supplies a set signal to the one-shot circuit 141 through the OR circuit 137. As before, the trigger circuit 141 resets after 6 microseconds and supplies an output signal to the shift lines of the shift register 45. Because the trigger circuit 131 is still in set condition and is coupled to the OR circuits 91, 92 and 97, a three-bit special code corresponding to a data code 1, 2, 7 is recorded and stepped into the register one stage, the previously recorded lead code being stepped to maintain its position one stage in advance. This special three-bit code may constitute a line feed code for a printer or other output device 56 (see FIG. 1). It may constitute some other function code for control of the output device, depending on the requirements of that device. It should be noted that the special three-bit code does not correspond to any of the data codes, since the data codes each include only a maximum of two bits, so that it is readily possible to distinguish the special code in the output interface circuit 57.

The one-shot trigger circuit 131 automatically resets 2.5 milliseconds after it is initially set (see FIG. 5). This terminates the operation of the code generators in recording the preliminary codes for initial control of the output interface 47 and the output device 56.

The leading edge of the card such as the card 23, entering the sensing station 26, is sensed by the photocells at the sensing station. An output signal is taken from one of these photocells, in this instance from the parity photocell 30 through the AND circuit 70, and is supplied to the flip-flop circuit 149, actuating the flip-flop circuit to its set condition. This produces an enabling signal that is supplied to the AND circuit 128, making it possible for a signal from the synchronizing disc photocell 42 to set the flip-flop circuit 129. Until the flip-flop circuit 129 is set, the connection from the "zero" output terminal of that flip-flop through the OR circuit 127 to the auxiliary reset terminals of each of the data flip-flop circuits 80, 81, 82, 84 and 87 maintains the data flip-flop circuits in reset condition. The setting of the flip-flop circuit 129 changes this condition and permits setting of the data flip-flop circuit.

SENSING OF A PARITY CODE CHARACTER

When the first code character comes into alignment with the sensing devices comprising the photocells 30, 31, 32, 34, and 37 at the sensing station 26 (FIGS. 1 and 3), just two of the photocells are obscured by the two code elements constituting the code character, assuming that it is a correct code character conforming to the two-element parity code. Inasmuch as no blanking signal has been applied to any of the AND circuits in the scanner circuit 38 (FIG. 2), the cut off of illumination of the two photocells is effective to supply set signals to two of the data flip-flop circuits 39. The setting of just two of the five data flip-flop circuits applies two input signals to the OR circuits 111 and 112. The output from OR circuit 112 actuates the amplifier 115 which in turn drives the amplifier 116 to produce an output signal of given polarity. In the specific circuit described hereinafter in connection with FIG. 6, a negative output signal is produced by the amplifier 116. This signal is of the appropriate polarity to constitute an enabling signal for the AND circuits 121 and 124 that are connected to the output of the amplifier 116. At the same time, the output of the amplifier 115 is of opposite polarity, so that there is no enabling signal supplied to the AND circuit 126.

The setting of the two data flip-flop circuits also results in the application of a set signal to the one-shot trigger circuit 118 through the OR circuit 117. After a time interval of 1.2 milliseconds, the one-shot trigger circuit 118 resets, supplying a set signal to the one-shot trigger circuit 119. While the one-shot circuit 119 remains in its set condition, it supplies an interrogation signal to the AND gate 121. Moreover, a short-interval blanking signal is supplied, through circuit 59 and the OR circuit 79, to all of the data AND circuits in the scanner circuit unit 38.

The enabling signal supplied to the AND circuit 121 upon setting of the one-shot trigger circuit 119 produces an output signal from the AND circuit that sets both of the one-shot trigger circuits 122 and 123. The setting of the one-shot trigger circuit 122 produces an output signal at its "one" terminal. This is a blanking signal of relatively long duration that is applied to the circuit 58 through the OR circuit 79 and thence to all of the AND circuits in the scanner circuit 38. This longer blanking signal precludes any further changes in setting of the data flip-flop circuits. After a time interval of five milliseconds, the one-shot circuit 122 automatically resets, terminating the blanking signal on the circuit 58.

When the one-shot trigger circuit 123 is driven to its set condition, as described above, an actuating signal is supplied to the AND circuit 124, which already has an enabling input from the amplifier 116 as described above. The resulting output signal from the AND circuit 124 is supplied, through the OR circuit 125, to the one-shot trigger circuit 136 to set that circuit.

Subsequently, the one-shot trigger circuit 136 automatically reverts to its original or reset condition. This produces an output signal on the "one" output terminal of the trigger circuit, a signal that is supplied to the OR circuit 137 to set the shift register one-shot trigger circuit 141. The one-shot circuit 141 resets after six microseconds, producing an output pulse on the shift lines in the shift register 45. The initial stage of the shift register, which has received either one or two data signals from the data flip-flops that have previously been set by action by the sensing photocells (the parity flip-flop 80 is not connected to any of the OR gates in the input to the shift register) records the code representative of the sensed code character and advances the recorded data one stage into the shift register. Of course, all previously recorded data in the shift register is also advanced one stage.

The one-shot circuit 123 automatically resets two milliseconds after it has been set. Upon reset of the circuit 123, a reset signal is supplied from its output terminal to each of the data flip-flop circuits 80, 81, 82, 84 and 87. This prepares the data flip-flop circuits for sensing of the next code character. It should be noted that the reset of the data flip-flop circuits occurs before the long-interval blanking signal from the inverter circuit 122 is terminated, the set period for the trigger circuit 123 being less than one-half that for the trigger circuit 122. Moreover, resetting of the data flip-flops is timed to occur after the code character data has been recorded in the shift register.

From the foregoing description, it is apparent that the two trigger circuits 122 and 123 which control the recording of data, as sensed, in the shift register 45, are actuated only when a parity condition is determined. It should also be noted that the time interval during which the one-shot trigger circuit 122 remains in its set condition should be selected to be long enough so that it is at least equal to the time required to advance a record member a full character width through the sensing station of the sensing system. This assures complete blanking while an individual character code that has been determined to satisfy the required parity conditions passes the scanning station without interfering with sensing of the next character code. The particular time intervals selected for the one-shot circuit 122 depends, of course, on the speed at which the card is fed, the width of each character code element, and the spacing between adjacent code characters. In this regard, it should further be noted that all time intervals specified herein are exemplary only, and may be varied to suit the requirements of the particular card feed and output devices employed.

SENSING OF A NON-PARITY CODE CHARACTER

An individual code character may be defective as the result of a failure to imprint all or part of one of the code elements. A code character may also be defective due to the presence of extraneous marking at a code element position not associated with that particular code, so that more than two sensing devices are obscured when the code character passes through the sensing station. Thus, a non-parity condition occurs when either less or more than two of the sensing devices constituting the photocells 30, 31, 32, 34 and 37 are obscured at the time the code character is canned. This, of course, results in the setting of either one or of more than two of the data flip-flop circuits 39.

The setting of a non-parity number of data flip-flop circuits (either one or more than two) leaves the amplifier 116 with a positive output, so that the two AND circuits 121 and 124 do not receive the requisite enabling signals. Consequently, the recording operation is not initiated through the AND circuit 124 and the long-term blanking signal is not developed by the one-shot trigger circuit 122.

The non-parity operating condition produces an output signal from the amplifier 115, which is applied to the AND circuit 126 and establises the AND circuit 126 in an enabled condition.

The setting of the non-parity number of data flip-flop circuits, however, does produce one or more output signals from the "one" terminals of those flip-flop circuits, these output signals being supplied through the OR circuit 117 to the input terminal of the one-shot trigger circuit 118. As before, the trigger circuit 118 remains in its set condition for a time interval of 1.2 milliseconds and then reverts to its normal or reset condition, supplying a set signal to the one-shot trigger circuit 119. The setting of the trigger circuit 119 supplies a short-interval blanking signal, through the circuit 59 and the OR circuit 79, to each of the data AND circuits 38, effectively blanking all of the sensing devices. Furthermore, the setting of the trigger circuit 119 supplies an actuating signal to the AND circuit 126. The output from the AND circuit is supplied through the OR circuit 127 to reset all of the data flip-flop circuits 39.

The duration of the short-interval blanking signal supplied during the time interval in which the one-shot trigger circuit 119 remains set is such that the code character being sensed does not clear the sensing station. Thus, when the trigger circuit 119 resets and the blanking signal terminates, the same code character is still aligned with the sensing devices and is scanned a second time. On the second scan, a parity condition may be detected, if a defectively imprinted code element has advanced to a point where it can be sensed by the corresponding sensing photocell. On the other hand, if the non-parity condition previously detected was the result of an extraneous mark narrower than the code element widths, and that mark is no longer aligned with one or more of the sensing photocells, a parity condition may also be determined. Under either circumstance, the operation described above for sensing of a code character that conforms to the two-element parity code is carried out by the sensing apparatus 20. However, if a non-parity condition is again detected, the sensing apparatus again refuses to record the code character, as described immediately above.

In the sensing operation, the system 20 may scan an individual code character as many as three or more times if a non-parity condition is detected on each scan. For each code character for which a parity condition is never established, there is a failure to record a data code in the shift register memory 45. This results in the detection of a reading error, subsequently, through operation of the decimal counter 52 and the read error gate 54 (FIG. 1), which is signalled to the output device 56 to prevent the recording of erroneous data or to afford some positive indication to the system operator that a reading error has occurred.

The multiple scanning of individual code characters, under conditions in which a non-parity situation is detected, makes it possible to effect accurate sensing of degraded records containing poorly imprinted code characters and miscellaneous extraneous marking. This is especially important in the machine reading of commercially prepared documents, particularly including those initially imprinted or otherwise prepared at a variety of locations with less than perfect control, as in commercial credit transactions. In the two, three, or even more scans of individual code characters, only a sensing of a character which conforms to the required parity condition results in the recording of data in the shift register 45, eliminating many errors that might otherwise occur.

From the foregoing description, it will be apparent that the one-shot trigger circuit 118 constitutes a delay means that effectively delays the operation of both of the blanking means for blanking the sensing devices; the short-interval blanking signal developed by trigger circuit 119 and the long-term blanking signal developed by trigger circuit 122 cannot be initiated until trigger circuit 118 has reset. Moreover, the same delay interval applies to the resetting of the data flip-flop circuits effected by the two reset means comprising the trigger circuit 123 (parity) and the AND circuit 126 (non-parity). The delay introduced by the trigger circuit 118 effectively compensates for possible misalignment of the code elements in a code character, for misalignment of the array of sensing devices at the sensing station, for variations in the response rates of the sensing devices, and other like potential sources of error.

END OF CARD CYCLE

After the last character code position on the card that is to be sensed has passed the sensing station 26, the synchronizing disc photocell 42 develops an output signal that is applied to the flip-flop circuit 129 to reset the flip-flop. When the circuit 129 has been reset, it produces an output signal that is supplied to the OR gate 127 of all of the data flip-flop circuits 39. This signal resets all of the data flip-flop circuits and maintains them in reset condition so that no more data can be sensed or recorded.

As the trailing end of the record member nears the sensing station, and after all code data has been scanned, the cam-actuated switch 156 (FIG. 4) is closed. This is effective to supply a reset signal to the card feed flip-flop circuit 132, resetting that circuit. The resetting of the card feed flip-flop circuit 132 produces an output signal that is inverted in the amplifier 134 (FIG. 2) and applied to the set terminal of the one-shot trigger circuit 133.

The setting of the one-shot trigger circuit 133 produces an output signal on the "one" terminal of that flip-flop circuit, a signal that is supplied to the OR circuits 91, 94 and 97. This signal is also supplied through the OR circuit 125 to the set terminal of the one-shot trigger circuit 136, setting the latter circuit. This initiates the recording of a special three-bit end code which is recorded in the shift register 45 just as in the case of the other special codes described above. When the trigger circuit 133 subsequently resets, it actuates a separate gate circuit (not shown) to supply an enabling signal to the AND circuit 139 so that clock pulses are again applied to the trigger circuit 138 to afford shift pulses that advance the stored information through the shift register 45 for a read-out operation. Inasmuch as the present invention is not directed to the readout apparatus, no detailed description of this operation is provided herein.

When the readout operation is complete, and the output device 56 has completed its operational cycle based on the information supplied through the interface unit 47, an output cycle completion signal is supplied from the output device through the OR circuit 151, the pulse circuit 153, and the amplifier 154 to the set terminal of the flip-flop circuit 132 (FIG. 4). This initiates the next feed cycle for the record members, which proceeds as described above. The output cycle completion signal is also applied to the flip-flop circuit 129 in FIG. 2 to make certain that that circuit starts the new sensing operation in its reset condition.

A SPECIFIC EMBODIMENT OF THE PARITY CHECK CIRCUIT

Figure 6:
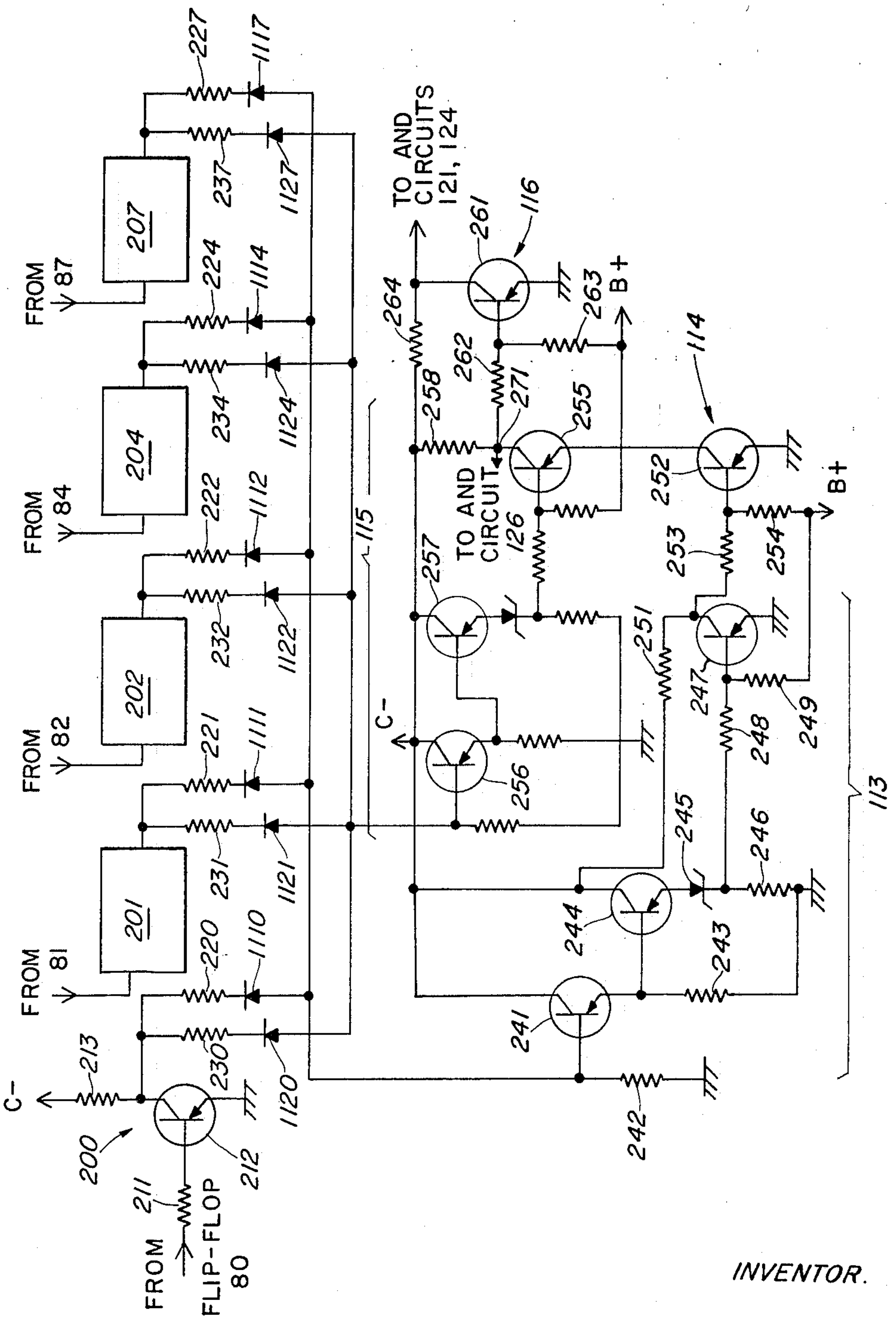
FIG. 6 is a schematic diagram of a parity circuit for the system of FIG. 2.

FIG. 6 illustrates a specific circuit that may be utilized as a principal component in the parity check circuit 57 (FIGS. 1 and 2). The illustrated circuit encompasses the OR circuits 111 and 112, and the amplifiers 113, 114, 115 and 116 (FIG. 2).

The circuit shown in FIG. 6 includes five individual input stages 200, 201, 202, 204 and 207 that are utilized to couple the data flip-flop circuits to the parity check circuit. The coupling circuit 200 is shown in detailed schematic form and comprises a coupling resistor 211 that connects the "zero" output of the data flip-flop circuit 80 to the base electrode of a transistor 22. The emitter of the transistor 212 is connected to system ground. The collector of the transistor 212 is connected through a resistor 213 to the C— supply. The collector of the transistor is also connected through a resistor 220 to a diode 1110 that is an integral part of the OR circuit 111 (see FIG. 2). A further connection from the collector of the transistor 212 is made through a resistor 230 to a diode 1120 that is a part of the OR circuit 112.

The coupling circuits 201, 202, 204 and 207 are identical in construction to the coupling circuit 200 described in detail immediately above. Accordingly, the internal circuitry for the coupling circuits has not been illustrated in FIG. 6. The output connections are shown for each of the remaining coupling circuits. Thus, one output circuit for the coupling circuit 201 comprises a resistor 221 connected to a diode 1111 that is a part of the OR circuit 111. The corresponding output for the coupling circuit 202 includes the resistor 222 and the diode 1112. For the coupling circuits 204 and 207 the related outputs include the resistor 224 and the diode 1114 in the one instance and the resistor 227 and the diode 1117 in the other. The diodes 1110, 1111, 1112, 1114 and 1117 are all electrically connected to each other to complete the OR circuit 111.

The same arrangement is used in completion of the OR circuit 112. Thus, there is an output from the coupling circuit 201 that includes a resistor 231 and a diode 1121, the related circuit for the coupling device 202 including the resistor 232 and the diode 1122. The related output circuits for the coupling circuits 204 and 207 comprise the resistor 234 and the diode 1124 in the one instance and the resistor 237 and the diode 1127 in the other. The diodes 1120, 1121, 1122, 1124 and 1127 are all electrically connected to each other to complete the OR circuit 112.

In the circuit arrangement illustrated in FIG. 6, the amplifier 113 (see FIG. 2) is a three stage amplifier. The first stage comprises a transistor 241 having its base electrode connected to the five diodes constituting the OR circuit 111, these being the diodes 1110 etc. The base electrode of the transistor 241 is also returned to system ground through a resistor 242. The collector electrode of this transistor is connected to the C— supply and the emitter electrode is returned to system ground through a load resistor 243.

The emitter electrode of the transistor 241 is also connected to the base electrode of a transistor 244 in the second stage of the amplifier 113. The collector of the transistor 244 is connected to the C— supply. The emitter electrode of this transistor is connected through a Zener diode 245 and a load resistor 246 to system ground.

The third stage of the amplifier 113 includes a transistor 247 having its base electrode connected through a series resistor 248 to the common terminal of the circuit elements 245 and 246 in the preceding stage of the amplifier. The base electrode of the transistor 247 is also connected through a resistor 249 to a low voltage positive polarity D.C. supply designated at B+. The emitter electrode of the transistor 247 is grounded and the collector electrode is connected through a resistor 251 to the C— supply.

The amplifier 114, in the form shown in FIG. 6, comprises a transistor 252 having its base electrode connected through a series resistor 253 to the collector electrode of the output stage transistor 247 in the amplifier 113. The base electrode of the transistor 252 is also connected to the B+ supply through a resistor 254. The emitter electrode of the transistor 252 is connected to system ground and the collector electrode is connected to the emitter of a transistor 255 in the output stage of the amplifier 115.

Amplifier 115 is a three stage amplifier that may be essentially identical in construction to the amplifier 113. The input stage includes a transistor 256, the intermediate stage comprises a transistor 257, and the output stage includes the transistor 255. The components for all three stages may be identical with the corresponding stages of the amplifier 113, except as noted hereinafter. The input connection to the amplifier 115 is taken from the OR circuit 112 comprising the diodes 1120, etc.

The output circuit for the amplifier 115 includes a load resistor 258 connected from the collector of the transistor 255 to the C— supply. This resistor 258 may be of somewhat different impedance from the corresponding resistor 251 in the amplifier 113. The amplifier 116 is similar to the amplifier 114, but with some variations. It includes a transistor 261 having its base electrode connected to the collector of the output transistor 255 for the amplifier 115 by means of a series resistor 262. The base electrode of the transistor 261 is also connected to the B+ supply through a resistor 263. The emitter of the transistor 261 is connected to system ground. The collector of the transistor 261 is connected to the C— supply through a resistor 264. The output connection from the amplifier 116 to the AND circuits 121 and 124 of FIG. 2 is taken from the collector electrode of the transistor 261. The output connection from the amplifier 115 to the AND circuit 126 of FIG. 2 is taken from the collector electrode of the transistor 255.

The transistor circuits of that portion of the parity check circuit 57 that is illustrated in FIG. 6 constitute relatively simple and conventional gating amplifiers, the circuit arrangement being such that the transistors are normally maintained conductive unless and until they are driven to cut off in response to signals received from the flip-flop circuits 80, 81, 82, 84 and 87. Because the operation of circuits of this kind is well known in the art, only a very brief description is provided herein. Upon occurrence of more than two input signals supplied to the amplifier 113 through the OR circuit comprising the diodes 1110 etc., the transistor 252 is driven to cut off. On the other hand, the transistor 255 is maintained conductive upon occurrence of any number of input signals to the circuit from the data flip-flops in excess of one. As a consequence, the terminal 271 in the output stage of the amplifier 115 is maintained approximately at ground potential for any circumstance in which exactly two data signals are present in the input to the parity check circuit but is maintained at a negative potential whenever less than two ore more than two data signals are present. The amplifier 116 is a simple inverter utilized to afford signals of the proper polarity for actuating the AND circuits 121 and 124 when parity conditions are established.

In order to afford a more complete disclosure of a typical embodiment of the present invention, specific circuit components for the parity circuit as illustrated in FIG. 6 are set forth in detail hereinafter. It should be understood that these data are furnished merely by way of illustration and in no sense as a limitation on the invention.

| Component: | Identification |
|---|---|
| Transistors **241, 244, 256, 257** | Type 2N3638 |
| Transistors **247, 252, 255, 261** | Type 2N404 |
| Resistors **211, 253, 262** ——kilohms | 4.3 |
| Resistors **213, 258, 264** ——do | 1.2 |
| Resistors **220, 221, 222, 224, 227** ——do | 56 |
| Resistors **230, 231, 232, 234, 237** ——do | 27 |
| Resistor **242** ——do | 10 |
| Resistor **243** ——do | 4.7 |
| Resistor **246** ——ohms | 470 |
| Resistor **248** ——kilohm | 1 |
| Resistor **249** ——kilohms | 47 |
| Resistor **251** ——do | 2.7 |
| Resistors **254, 263** ——do | 36 |
| Diodes **1110**, etc. | Type IN270 |
| Diodes **1120**, etc. | Type IN270 |
| Zener diode **245** (Type IN4730A) ——volts | 3.9 |
| C— supply ——do | —15 |
| B+ supply ——do | +10 |

As noted above, the scanning system of the present invention affords a positive parity check with respect to each individual code character. Even more, it provides for an effective parity check to be made two, three, or even more times with respect to each individual character to the extent necessary to determine positively the code character does in fact correspond to the required parity condition. The multiple scanning operation, combined with the internal parity check, eliminates many potential reading errors and makes it possible to obtain accurate and effective sensing of machine readable symbols that may be dirty, poorly printed, or otherwise degraded.

While a preferred embodiment of the invention has been described and illustrated, it is to be understood that this is capable of variation and modification. Accordingly, the aim in the appended claims is to cover all such variations and modifications as may fall within the true spirit of the invention.

What is claimed is:

1. In a machine utilizing machine-read code data, and including record feed means for advancing a record member through a scanning system a scanning system for reading code characters of given width disposed in predetermined spaced relation on a record member, each code character including a given number of individual code elements according to a predetermined parity code, said scanning system comprising:

plural sensing devices, at said sensing station, for sensing the presence of individual code elements and developing initial data signals representative thereof;

a parity circuit, coupled to said sensing devices and responsive to said data signals, for developing a parity signal whenever the code elements of a sensed code character correspond to a parity condition and for developing a non-parity signal whenever the code elements of a sensed code character correspond to a non-parity condition;

first blanking means, actuated by said parity signal, for effectively inactivating said sensing devices for a first predetermined time interval at least equal to the time required to advance said record member one character width through said sensing station; and second blanking means, actuated by said non-parity signal, for effectively inactivating said sensing devices for a second predetermined time interval, substantially shorter than the time required to advance said record member one character width through said sensing station, to provide for plural independent sensing of any code character found to exhibit a non-parity condition.

2. A scanning system according to claim 1, further comprising: data utilization means; and a plurality of gate circuits, one for each sensing device, coupling said sensing devices to said data utilization means and to said parity circuit;

said first and second blanking means each comprising means for developing a blanking signal and applying that signal to all of said gate circuits to actuate said gate circuits to closed condition.

3. A scanning system according to claim 1, further comprising: data utilization means; and a plurality of data flip-flop circuits, one coupled to each sensing device and each actuatable from a reset condition to a set condition in response to a data signal, for coupling said sensing devices to said data utilization means and to said parity circuit; and reset circuit means for applying said non-parity signal to all of said data flip-flop circuits to reset said data flip-flop circuits upon determination of a non-party condition.

4. A scanning system according to claim 3, in which said second blanking means comprises means for developing a short-interval blanking signal each time a code character is scanned, and in which said reset circuit means comprises an AND gate responsive to the simultaneous presence of said non-parity signal and said short-interval blanking signal.

5. A scanning system according to claim 1, further comprising: data utilization means;

a plurality of data flip-flop circuits, one coupled to each sensing device and each actuatable from a reset condition to a set condition in response to a data signal, for coupling said sensing devices to said data utilization means and to said parity circuit; and reset means, actuated by said parity signal, for resetting all of said data flip-flop circuits prior to completion of said first time interval.

6. A scanning system according to claim 1, further comprising:

delay means for delaying operation of said first and second blanking means for a predetermined time to compensate for possible misalignment of the code elements in a code character misalignment of the sensing devices, and related factors.

7. A scanning system according to claim 1, further comprising data utilization means;

a plurality of gate circuits, one for each sensing device, individually coupled to respective ones of said sensing devices;

said blanking means each comprising means for developing a blanking signal and applying that signal to all of said gate circuits to actuate said gate circuits to closed condition;

a plurality of data flip-flop circuits, each actuatable from a reset condition to a set condition in response to a data signal, individually coupled to respective ones of said gate circuits, for supplying said data signals to said data utilization means and to said parity circuit;

first reset means, actuated by said parity signal, for resetting all of said data flip-flop circuits prior to completion of said first time interval upon determination of a parity condition; and second reset means, actuated by said non-parity signal, for resetting all of said data flip-flop circuits upon determination of a non-parity condition.

8. A scanning system according to claim 7, further comprising delay means for delaying operation of both said blanking means and both said reset means for a predetermined time to compensate for possible misalignment of the code elements in a code character, misalignment of the sensing devices, and related factors.

References Cited

UNITED STATES PATENTS

| | | | |
|---|---|---|---|
| 3,324,460 | 6/1967 | Leonard et al. | 235—61.7 X |
| 3,386,079 | 5/1968 | Wiggins | 340—146.1 |

DARYL W. COOK, Primary Examiner

U.S. Cl. X.R.

340—146.1